United States Patent [19]
Chittenden et al.

[11] 3,820,546
[45] June 28, 1974

[54] COMBINED AIR VENT, FILTER AND ADAPTER FOR URINARY DRAINAGE ASSEMBLIES

[75] Inventors: Richard Marion Chittenden, Grayslake; Aldean William Whitton, Northbrook; Fidel Vallaluna Macalalad, Lake Forest; Richard Massman, Winnetka; Earl David Wilson, Ingleside, all of Ill.

[73] Assignee: Abbott Laboratories, North Chicago, Ill.

[22] Filed: Sept. 1, 1972

[21] Appl. No.: 285,711

Related U.S. Application Data

[62] Division of Ser. No. 66,951, Aug. 26, 1970, Pat. No. 3,640,315.

[52] U.S. Cl. ............................................. 128/349
[51] Int. Cl. ........................................... A61m 25/00
[58] Field of Search ..... 137/215, 441; 128/DIG. 24, 128/275, 276, 294–295, 247, 349–350

[56] References Cited
UNITED STATES PATENTS

| | | | |
|---|---|---|---|
| 3,084,690 | 4/1963 | Jones, Jr. | 128/350 |
| 3,122,139 | 2/1964 | Jones, Jr. | 128/350 |
| 3,396,727 | 8/1968 | Mount | 128/349 R |
| 3,419,009 | 12/1968 | Ericson | 128/349 R |
| 3,429,314 | 2/1969 | Ericson | 128/349 R |
| 3,529,599 | 9/1970 | Folkman et al. | 128/275 |
| 3,598,124 | 8/1971 | Andersen et al. | 128/275 |
| 3,604,420 | 9/1971 | Vaillancourt | 128/275 |

Primary Examiner—Charles F. Rosenbaum
Attorney, Agent, or Firm—Aaron L. Hardt; Gildo E. Fato; Robert L. Niblack

[57] ABSTRACT

A combined air vent, filter and adapter for connecting a urinary drainage catheter to a collection container is disclosed. The combined device comprises two tubular extensions joined by a cylindrical chamber of larger diameter than the tubular extensions and having an opening therein through which air can pass. The opening is covered with a filtering material of a pore size selected to filter bacteria from the air entering it.

6 Claims, 8 Drawing Figures

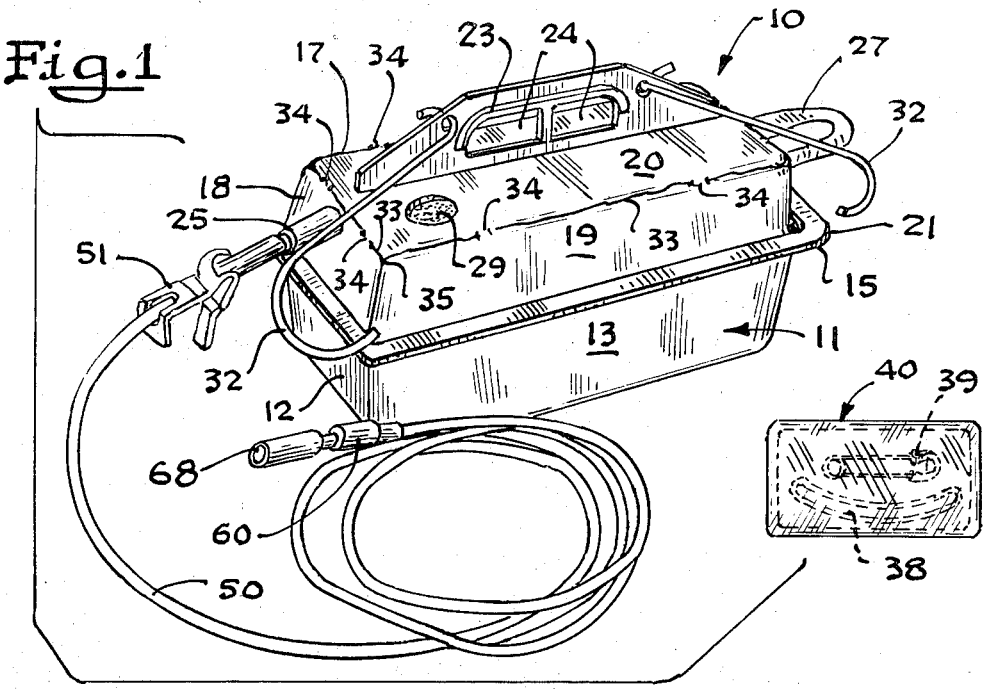
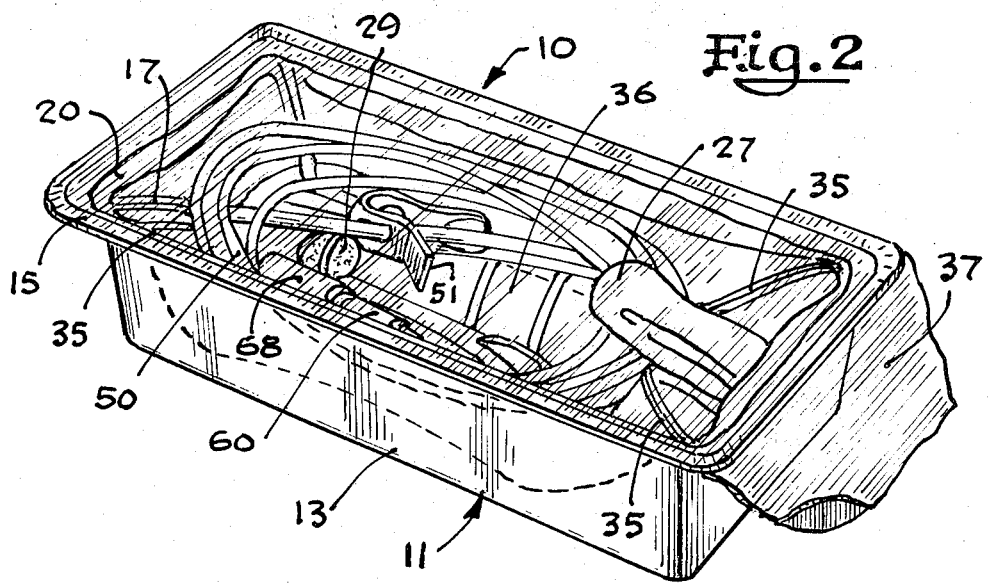

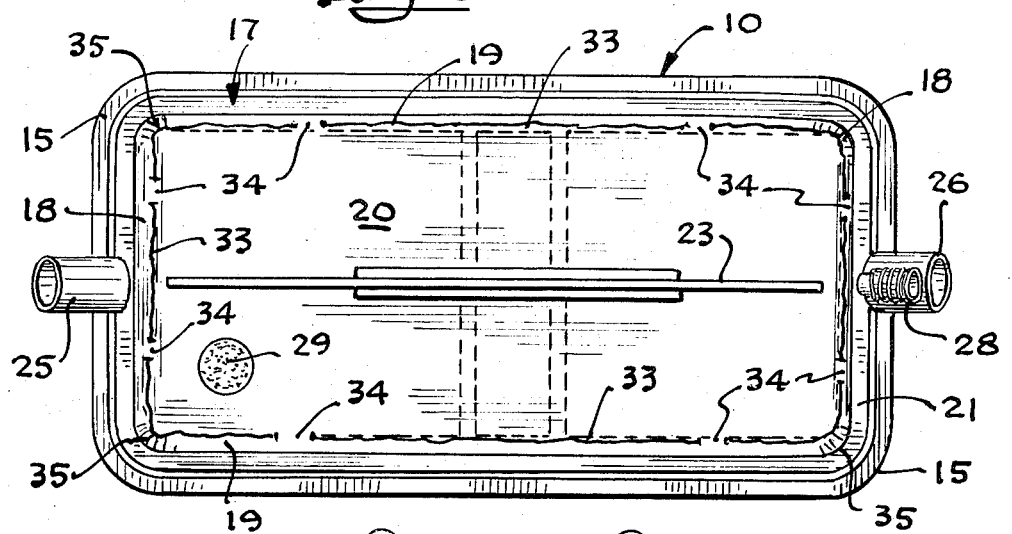
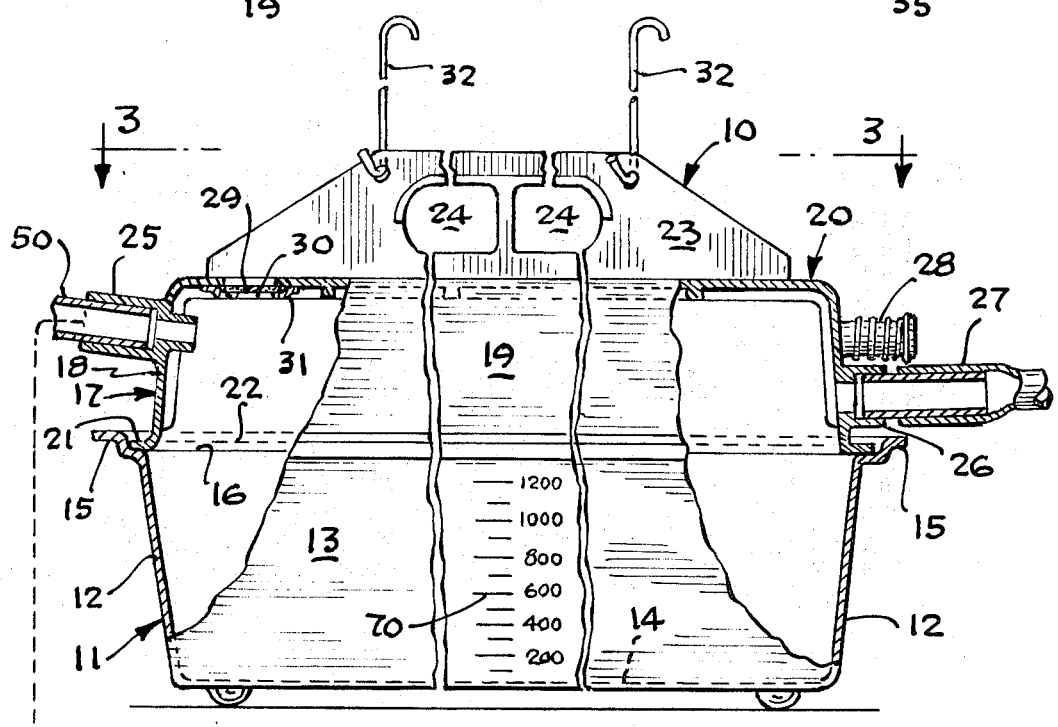
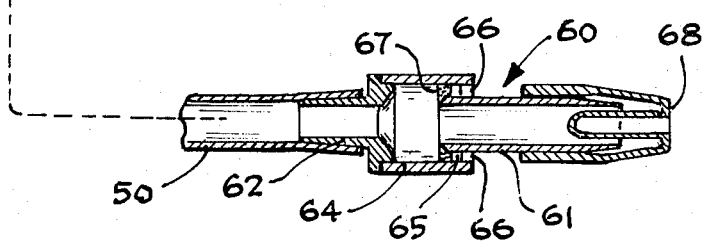

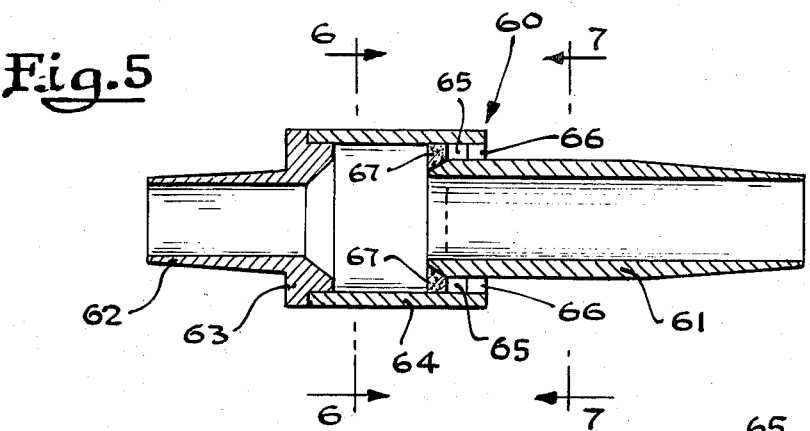
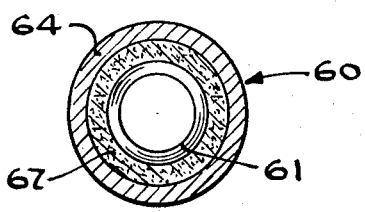
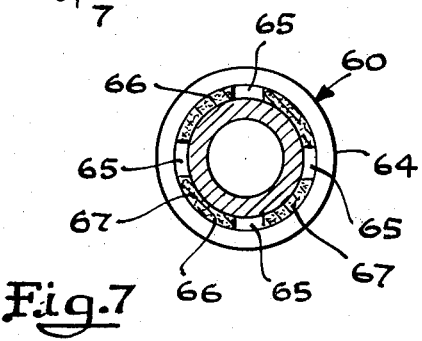
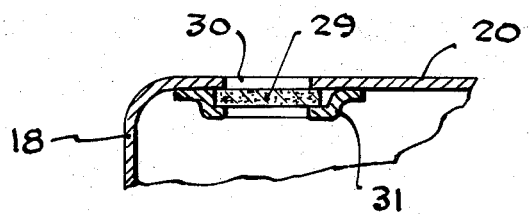

COMBINED AIR VENT, FILTER AND ADAPTER FOR URINARY DRAINAGE ASSEMBLIES

This is a division of application Ser. No. 066,951, filed Aug. 26, 1970 now U.S. Pat. No. 3,690,315.

BACKGROUND OF THE INVENTION

Medical procedures oftentimes require artificial drainage of urine from the bladder. For example, when voluntary control is temporarily or permanently lost, urine must be drained by artificial means. One method is to place a urethal catheter into the bladder which can be left in place for some period of time or taken out immediately after drainage. If left in place, it is necessary to connect the catheter to a urinary drainage collection system. Such systems generally consist of a drainage tube, one end of which is connected to the urethral catheter by means of an adapter and the other end is connected to a collection container. A commonly used collection container is generally in the form of a bag fabricated from suitable plastic sheeting which is folded over and sealed around the edges. With a bag-type fluid receptacle or container a continuous fluid path is sometimes formed from the bag through the tubing and catheter and into the bladder. This is primarily caused by the close proximity of the walls of the bag which allows a film of fluid to be present on the walls providing a continuous fluid path. As a result, bacterial contamination of the urinary tract can result since the continuous fluid path provides a convenient means for retrograde migration of bacteria. Break chambers or other means of providing an air pocket are sometimes employed in such systems to interrupt the fluid path and thereby minimize or inhibit microbial retrograde migration.

SUMMARY OF THE INVENTION

The combined container and package of the present invention comprises a substantially rigid portion and a foldable portion, the foldable portion being collapsible within the rigid portion. The bottom rigid portion can be formed of rigid vinyl sheeting for example, by thermo-forming procedures and has the general configuration of a tray with side and end walls and a bottom. The top foldable portion is of substantially the same configuration as the rigid portion and can be formed of plasticized vinyl. The two portions are sealed together by means of a flange on each piece which extends around the periphery of the opening. The foldable portion includes fold lines, which are preferably stiffening ribs, coincidental with the juncture of the end walls, side walls and top to facilitate its collapse upon the application of a compressive force. The container can be provided with suitable inlets and outlets.

By folding the foldable portion within the rigid portion a storage space is provided for other parts which may be employed with the container. An appropriate cover is sealed to the flange to complete the package.

The combined container and package of this invention has particular application for urinary drainage systems in which the opened container becomes the fluid receptacle. The tubing adapters, clamps and other parts are stored in the collapsed container and a cover is attached to maintain sterility of the container and set. To use such a urinary drainage container and set one need only peel off the cover, remove the administration set, withdraw the top foldable portion of the container until the full three-dimensional shape is obtained and the set and container are then ready for use.

The advantages over presently existing drainage containers and systems are:

1. Three-dimensional shape of the container inhibits retrograde bacterial contamination of the bladder.

2. Container is its own package which reduces the cost of additional packaging as well as reducing the cost of secondary packaging operations after sterilization.

3. Combination air vent and catheter adapter eliminates the standing column of urine which in turn can cause suction on the bladder mucosa drawing it into this catheter (irritating the bladder and causing trauma) and which acts as a path for retrograde bacterial contamination of the bladder.

4. Alleviates the storage problem attendant with disposable items because of the space saving feature of the container which also acts as a package for the other components.

5. The assembly is convenient to use

6. The container permits bottom, and emptying with is more convenient than side or top emptying.

DRAWINGS

The combined container and package will be better understood upon reference to the following drawings in which:

FIG. 1 is a perspective view of the container in the open position when employed with a complete urinary drainage system;

FIG. 2 is a perspective view of the combined container and package in the closed position with the tubing, clamp and other portions of the urinary drainage system stored therein and sealed with a peelable cover;

FIG. 3 is a top elevational view of the container when in the open position as viewed along the line 3—3 of FIG. 4;

FIG. 4 is a fragmentary side elevational view partly in cross section and including the tubing and air vent filter of a urinary drainage system;

FIG. 5 is a side elevational view in cross section of the combined air vent filter and adapter;

FIG. 6 is a cross-sectional view taken along the line 6—6 of FIG. 5;

FIG. 7 is a cross-sectional view taken along the line 7—7 of FIG. 5;

FIG. 8 is a fragmentary cross-sectional view illustrating the container air vent filter.

DETAILED DESCRIPTION

Referring to FIG. 1 there is shown a combined container and package 10 when employed with a urinary drainage system. The combined container and package 10 comprises a substantially rigid bottom portion 11 having end walls 12, side walls 13 and a bottom 14 and generally has the configuration of a tray. Around the periphery of the opening 16 is a projecting flange 15. The top collapsible portion 17 of the combined container and package 10 has substantially the same configuration as the bottom rigid portion 11 and is formed by end walls 18, side walls 19 and a top panel 20. As with the bottom portion 11, a flange 21 projects around the periphery of the opening 22. As best seen in FIG. 4, the flanges 15, 21 of the two portions are sealed together at the periphery of openings thereof to so define a container. To facilitate opening of the container 10 to its full three-dimensional shape as illustrated in FIG. 1, a handle 23 with finger openings 24 extends from the top panel 20 of the collapsible portion 17. As best illustrated in FIG. 4 the container 10 is provided with an inlet port 25 and an exit port 26. In the embodiment illustrated, a short piece or segment of tubing 27 is positioned over the exit port 26. To close off the exit 26 until such time as it is desired to drain the contents of the container 10 a clamp (not shown) can be positioned on the tubing 27. In the embodiment illustrated, to serve as an opening and closing means a fitment 28 in communication with the interior of the container 10 and tightly engageable with the tubing 27 is provided in close proximity to the exit port 26. Accordingly, during use of the container 10 the tubing 27 is folded and the open end thereof is slipped over the fitment 28 as illustrated in FIG. 1 to seal off the exit 26. When it is desired to drain the contents of the container 10, the tubing 27 is removed from the fitment 28, the handle 23 is grasped with the fingers and the container 10 is tilted to drain the contents through the exit port 26 and tubing 27. To permit the escape of air during filling of the container 10 and to facilitate opening thereof a filter 29 can be provided in the container 10. To minimize the possibility of any fluid leakage through the filter 29 it is positioned in the top panel 20 of the collapsible portion 17 at an opening 30 opposite the drain end of the container and is held in place by a vinyl retaining ring 31 which is sealed to the undersurface of the top panel 20 by conventional means. Urethane foam is a suitable material for the filter 29. Hangers 32 are provided so that the container 10 can be hung from the bottom of a bed or from a chair if so desired.

To facilitate folding of the top portion 17 so that it may be readily collapsed into and withdrawn from the substantially rigid bottom portion 11, fold lines 33 are provided coincidental with the intersection of the end walls 18, side walls 19 and top panel 20 of the top portion 17. The fold lines 33 may be weakened portions to facilitate folding or as in the embodiment illustrated can comprise ribs which are thicker than the walls 18, 19 or top panel 20. The stiffening ribs 33 reduce the tendency of the flexible top portion 17 to bend where a bend is not desired, particularly in the collapsed position. To further facilitate folding, spaced interruptions 34 are provided in the stiffening ribs 33 at points near the corners 35 of the top collapsible portion 17. When the top 17 is in the collapsed or folded state inside container bottom 11, the corners 35 are left protruding out, rather than pushed in to conform to the natural profile of the container. This, along with stiffening rib 33 and spaced interruptions 34 insures complete withdrawal of the top portion 17, particularly of the corners 35 thereof. When the top portion 17 is folded or collapsed within the substantially rigid bottom portion 11 as illustrated in FIG. 2, a storage area 36 is formed and other parts to be used with the package can be placed therein and a cover 37 can be sealed over the opening. In the embodiment illustrated, as best seen in FIG. 4, the flange 15 of the bottom portion 11 projects beyond the flange 21 of the top portion 17 thus providing a surface to which the cover 37 can be sealed. When used with the urinary drainage system the cover 37 should preferably be permeable to gases in order to permit gas sterilization of the combined container and package 10 together with its contents. A suitable material for the cover 37 is spun-bonded polyethylene sheet with a suitable coating on one side for sealing to the flange 15 of the container 10.

Unvented urinary drainage systems such as many currently being used exhibit difficulty in draining urine from the bladder. In addition to difficulty in draining of the urine, they may also be traumatic to the bladder mucosa. This is caused by the siphon or vacuum effect of the column of urine in the drainage catheter tube, and collection container. The vacuum produced may result in drawing of the mucosa into the inlet ports of the drainage catheter where it interrupts the flow of urine into the catheter tube, and container. Such trauma can lead to urinary bladder inflammation and, eventually, infection. Furthermore, there is considerable difficulty in removing blockage caused by clots and debris with an unvented drainage system. Such systems require manipulation of the drainage tube until the obstruction is removed and often it becomes necessary to disconnect the tube from the catheter in order to remove the obstruction. This may subject the system to possible bacteria contamination. Many urination drainage systems are presently vented by puncturing the line with a needle or having a "Y" connector in the line, one leg of the "Y" acting as a vent.

When the combined container and package 10 is utilized in a urinary drainage system, a drainage tube 50 is inserted into the inlet port 25. A clamp 51 may be inserted in the tubing line 50, if desired, to control flow if necessary. At the proximal end (the end closest to the drainage catheter) of the drainage tube 50 a combined air vent filter and adapter 60 is inserted. By venting the urinary drainage system the noted difficulties in draining urine and possible trauma to the bladder are obviated. The air vent filter and adapter 60 connects directly to the drainage catheter (not shown) and the vent allows air to enter into the tube 50 establishing atmospheric pressure at the point which permits the column of urine to drain by gravity. By covering the vent openings with a filtering material, liquid will not be allowed to flow out the tubing 50 in the reverse direction and by selecting material of the appropriate pore size, bacteria from the air will be prevented from entering the system. A hydrophobic filtering material such as Gelman AN-200 is suitable. Thus, the air vent filter is an integral part of the adapter which connects to the drainage catheter and nonsterile line puncturing is eliminated. The combined air vent filter and adapter 60 comprises concentric, tapered tubular extensions 61, 62. The drainage tube 50 is inserted over the tapered tubular extension 62 while the tapered tubular extension 61 on the other end of the air vent 60 is connected to the drainage catheter. An annular projection 63 extends from the tapered tubular extension 61. A cylindrical element 64 joins the two tubular extensions 61, 62 to form a filtering or air vent chamber. Legs 65, as best seen in FIG. 7, connect the cylindrical element 64 and the tubular extension 61 to define openings 66 through which air can pass. A filter ring 67 is formed in place by insert molding procedures to cover the openings 66 as described in co-pending patent application, filed July 7, 1970. To protect the adapter 60 before it is connected to the drainage catheter a hood or dust cover 68 is positioned on the tubular extension 61. A graduated measuring scale 70 can be imprinted on the side of the container to facilitate convenient measurement of the fluid contents in the container 10.

The bottom portion 11 of the combined container and package 10 can be formed of rigid vinyl sheeting by thermo-forming methods while the top collapsible portion 17 of substantially the same overall size and configuration as the bottom portion 11 can be fabricated of plasticized vinyl. After the two portions are sealed together at their flanges 15, 21 the top collapsible portion 17 is folded within the bottom rigid portion 11. The tubing 50 with the attached air vent filter and adapter 60 is coiled and placed on top of the folded collapsible portion 17 along with other components of the system. An appropriate, removable cover 37 is sealed to the flange 15 on the substantially rigid bottom portion 11, as previously described, to complete the package. The entire package and contents is then sterilized by gas sterilization techniques, using ethylene oxide, for example.

To use the urinary drainage system, the cover 37 is removed to expose the tubing 50 and other components which are removed from the package. By pulling on the handle 23 the collapsible portion 17 is withdrawn until the full three-dimensional shape of the container 10 is obtained. The adapter 60 is connected to a drainage catheter (not shown) and the system is ready for use. If desired, a rubber band 38 and safety pin 39 sealed in an envelope 40 may be provided. The rubber band can be folded on the tubing 50 and then clipped to the bed with the pin 39. The rubber band 38 will thus permit some movement of the tubing 50 with movement of the patient and yet prevent undesirable movement of the container.

What is claimed is:

1. In a tubular adapter for use with a urinary drainage system, wherein said tubular adapter has one extension thereof adapted for engagement with a drainage catheter and the other extension thereof adapted for engagement with the proximal end of a drainage tube joined at its distal end to a urine collection container to thereby provide a consecutive flow path through said catheter, adapter and tube into said container, and wherein said tubular adapter is further characterized by a filtered opening therein in communication with said flow path and covered by a bacteria filtering material through which air can pass but body fluids cannot, which filtered opening is adapted to admit filtered, atmospheric air into said flow path in the vicinity of said proximal end of said drainage tube, the improvement which comprises:

a diametrically enlarged chamber portion in said tubular adapter intermediate said extensions thereof and having said filtered opening disposed in an end wall of said enlarged chamber transverse to said flow path.

2. The adapter of claim 1, wherein said enlarged chamber is cylindrical.

3. The adapter of claim 1, wherein said bacteria filtering material is hydrophobic.

4. The adapter of claim 1, wherein said filtered third opening is disposed in said end wall adapted for facing said catheter when said catheter is joined to said adapter.

5. The adapter of claim 1, wherein the configuration of said filtered third opening is an annulus.

6. The adapter of claim 1, wherein said filtered third opening is defined by legs connecting the portion of said adapter defining said enlarged chamber to adjacent portions of said adapter.

* * * * *